US012661848B2

(12) United States Patent　(10) Patent No.: US 12,661,848 B2
Kurzac　(45) Date of Patent: Jun. 23, 2026

(54) SYSTEM AND METHOD FOR THREE-DIMENSIONAL PRINTING OF COLLIMATOR

(71) Applicant: GE Precision Healthcare LLC, Waukesha, WI (US)

(72) Inventor: Jaroslaw Kurzac, Oconomowoc, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 353 days.

(21) Appl. No.: 18/357,415

(22) Filed: Jul. 24, 2023

(65) Prior Publication Data

US 2025/0033274 A1　Jan. 30, 2025

(51) Int. Cl.
　*B29C 64/153*　(2017.01)
　*B33Y 10/00*　(2015.01)
　*B33Y 80/00*　(2015.01)

(52) U.S. Cl.
　CPC ............ *B29C 64/153* (2017.08); *B33Y 10/00* (2014.12); *B33Y 80/00* (2014.12)

(58) Field of Classification Search
　None
　See application file for complete search history.

(56) References Cited

U.S. PATENT DOCUMENTS

2004/0099996 A1* 5/2004 Herzog .................. B33Y 30/00
　　　　　　　　　　　　　　　　264/401
2016/0200051 A1* 7/2016 Urbanic ............... B29C 64/393
　　　　　　　　　　　　　　　　264/308

2018/0079150 A1* 3/2018 Ho ......................... B29C 64/386
2019/0176397 A1* 6/2019 Stapleton ............... B22F 5/009
2019/0329322 A1* 10/2019 Preston .............. H04N 1/00037
2020/0061909 A1* 2/2020 Tsai ....................... B29C 64/386
2020/0114422 A1* 4/2020 Mark .................... B29C 64/118
2020/0306883 A1* 10/2020 Wilson .................. B33Y 30/00
2021/0283832 A1* 9/2021 Bouhnik .............. B29C 64/153
2022/0252392 A1* 8/2022 Goodwin .............. B33Y 10/00
2022/0347920 A1* 11/2022 Mantell ................ B29C 64/214
2023/0030232 A1* 2/2023 Buller ...................... B22F 5/04

(Continued)

FOREIGN PATENT DOCUMENTS

CN　　114713848　　7/2022
DE　102021206000 A1　12/2022

OTHER PUBLICATIONS

EP application 24187559.0 filed Jul. 9, 2024—extended Search Report issued Dec. 9, 2024; 11 pages.

*Primary Examiner* — Hua Lu
(74) *Attorney, Agent, or Firm* — Fletcher Yoder, P.C.

(57)　　　　　ABSTRACT

A method for forming a metallic grid structure includes utilizing 3D printing for printing a first layer of a first wall section of the metallic grid structure in a first direction along a first vector offset from a center line of the first wall section by half of a first distance of a first width of the first wall section that is orthogonal to the center line. The method also includes utilizing 3D printing for printing a second layer of the first wall section on the first layer in a second direction along a second vector offset from the first line of the first wall section by half of the first distance of the first width of the first wall section, wherein the second direction is opposite the first direction, and the first vector and the second vector are disposed on opposite sides of the center line.

12 Claims, 9 Drawing Sheets

(56) References Cited

U.S. PATENT DOCUMENTS

| | | | | |
|---|---|---|---|---|
| 2023/0219289 A1* | 7/2023 | Miller | .................. | A61L 27/507 |
| | | | | 264/497 |
| 2023/0294362 A1* | 9/2023 | Keur | .................... | B29C 64/118 |
| | | | | 700/118 |
| 2024/0051230 A1* | 2/2024 | Bonanno | .............. | B29C 64/393 |
| 2024/0066599 A1* | 2/2024 | Korepanov | ............ | B22F 10/28 |
| 2024/0278326 A1* | 8/2024 | Albert | .................... | B22F 10/28 |

* cited by examiner

SYSTEM AND METHOD FOR THREE-DIMENSIONAL PRINTING OF COLLIMATOR

BACKGROUND

The subject matter disclosed herein relates to three-dimensional (3D) printing of a collimator.

Various mechanical and micro-mechanical systems may employ gratings or grids that include some form of trench or other opening defined at least partially by sidewalls (e.g., vertical sidewalls or septa). Such gratings or grids may be employed to limit or collimate the passage of energy or material from one side of the grating or grid to the opposite side or may perform other functions where the trench or other sidewall structures facilitate the functioning of the overall system.

Additive manufacturing technologies are getting more popular for utilization in the industry environment. The manufacturability of multiple materials (e.g., 316L, J13 Iconel 718, 625, AlSi10Mg, etc.) is well established. However, refractory materials still pose a challenge especially for laser powder bed fusion (LPBF) technologies. At the same time, tungsten printing is a niche and limited industries are investing in it. For example, manufacturing of a computed tomography (CT) collimator using 3D printing is challenging due to thin walls, close manufacturing tolerances, and utilization of tungsten material. Utilizing LPDF to make a 3D printed collimator needing multiple layers (for building thickness) currently produces an article with lower than acceptable density and rough surfaces that raise quality issues.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosed subject matter may encompass a variety of forms that may be similar to or different from the embodiments set forth below.

In one embodiment, a method for forming a metallic grid structure is provided. The method includes utilizing three-dimensional (3D) printing for printing a first layer of a first wall section of the metallic grid structure in a first direction along a first vector offset from a first center line of the first wall section by half of a first distance of a first width of the first wall section that is orthogonal to the first center line. The method also includes utilizing 3D printing for printing a second layer of the first wall section on the first layer in a second direction along a second vector offset from the first center line of the first wall section by half of the first distance of the first width of the first wall section, wherein the second direction is opposite the first direction, and the first vector and the second vector are disposed on opposite sides of the first center line.

In an additional embodiment, a method for forming a collimator configured for use with an X-ray detector of an X-ray imaging system is provided. The method includes utilizing three-dimensional (3D) printing for alternately printing layers of a first set of septa of the collimator extending in a first direction by alternating between utilizing a first vector and a second vector in printing the layers of the first set of septa, wherein the first vector and the second vector are oriented in opposite directions along the first direction, disposed on opposite sides of a first center line of a respective septa of the first set of septa, and offset from the first center line half of a first distance of a first width of the respective septa of the first set of septa. The method also includes utilizing 3D printing for alternately printing layers of a second set of septa of the collimator extending in a second direction by alternating between utilizing a third vector and a fourth vector in printing the layers of the second set of septa, wherein the third vector and the fourth vector are oriented in opposite directions along the second direction and disposed on opposite sides of a second center line of a respective septa of the second set of septa, and offset from the second center line half of a second distance of a second width of the respective septa of the second set of septa, wherein the first direction is orthogonal to the second direction.

In a further embodiment, a system for forming a collimator configured for use with an X-ray detector of an X-ray imaging system is provided. The system includes a memory encoding processor-executable routines. The system also includes processing circuitry configured to access the memory and to execute the processor-executable routines, wherein the routines, when executed by the processing circuitry, cause the processing circuitry to perform actions. The actions include utilizing three-dimensional (3D) printing for alternately printing layers of a first set of septa of the collimator extending in a first direction by alternating between utilizing a first vector and a second vector in printing the layers of the first set of septa, wherein the first vector and the second vector are oriented in opposite directions along the first direction, disposed on opposite sides of a first center line of a respective septa of the first set of septa, and offset from the first center line half of a first distance of a first width of the respective septa of the first set of septa. The actions also include utilizing 3D printing for alternately printing layers of a second set of septa of the collimator extending in a second direction by alternating between utilizing a third vector and a fourth vector in printing the layers of the second set of septa, wherein the third vector and the fourth vector are oriented in opposite directions along the second direction and disposed on opposite sides of a second center line of a respective septa of the second set of septa, and offset from the second center line half of a second distance of a second width of the respective septa of the second set of septa, wherein the first direction is orthogonal to the second direction.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 7 depicts an image from above of a portion of a collimator printed utilizing the conventional printing strategy in FIG. 5;

FIG. 8 depicts an image from above of a portion of collimator printed utilizing the zig-zag printing strategy in FIG. 6, in accordance with aspects of the present disclosure;

DETAILED DESCRIPTION

Figure 1:
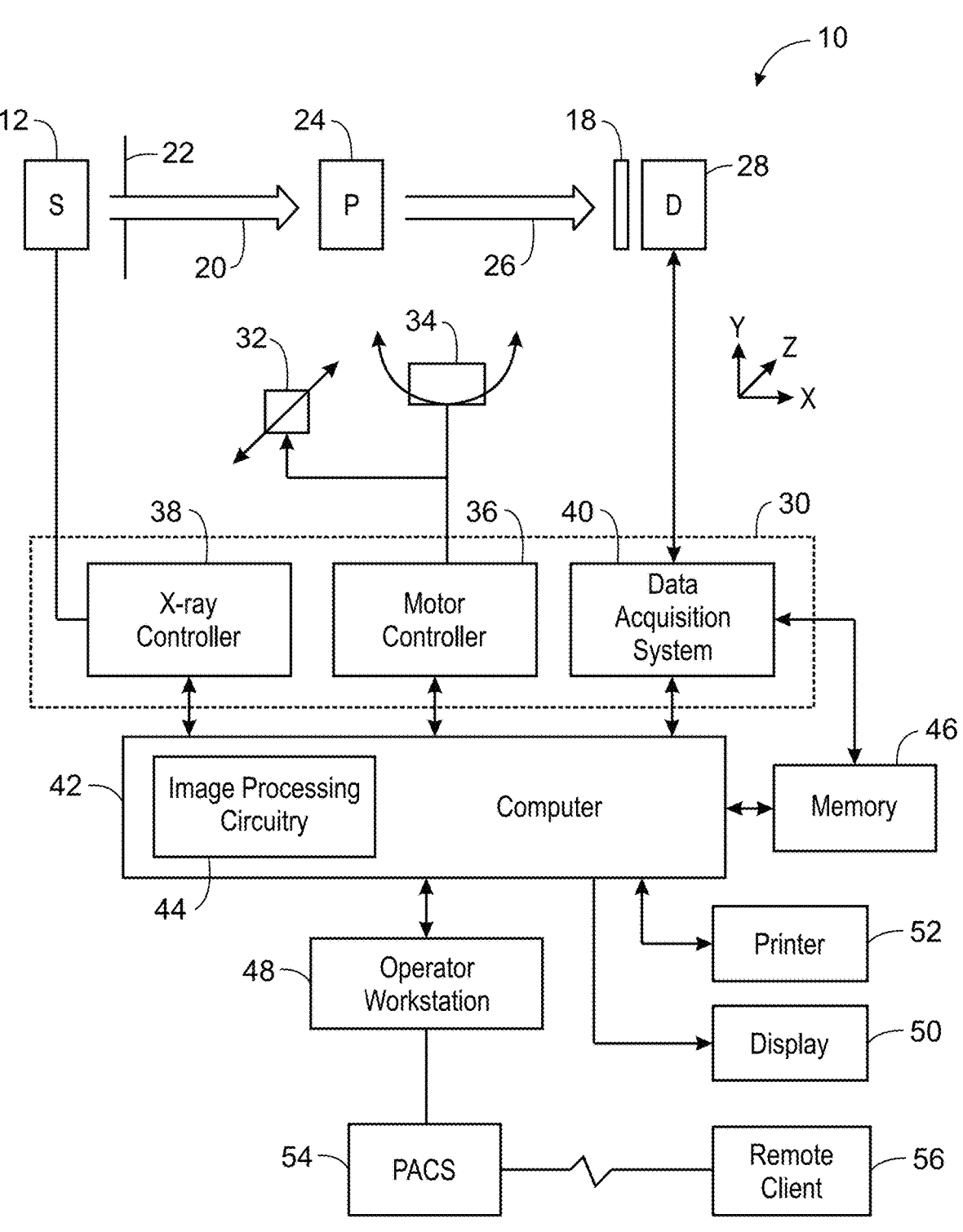
FIG. 1 depicts components of a computed tomography imaging system, in accordance with certain aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion may be provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as tomographic image reconstruction for industrial Computed Tomography (CT) used in non-destructive inspection of manufactured parts or goods (i.e., quality control or quality review applications), and/or the non-invasive inspection of packages, boxes, luggage, and so forth (i.e., security or screening applications). In general, the present approaches may be useful in any imaging or screening context that utilizes X-ray imaging gratings such as collimator or anti-scatter grids. Also, although discussed in the context of CT imaging, the present approaches may be utilized in any imaging system that utilizes a collimator or anti-scatter grid (e.g., conventional X-ray imaging system, positron emission tomography imaging, etc.).

The present techniques relate to various aspects of additively manufacturing (e.g., three-dimensional (3D) printing of an X-ray grating or metallic grid structure (e.g., collimator or X-ray grid). The present techniques provide for a customized single vector zig-zag printing strategy (i.e., single vector per layer of a given wall or given wall section) that utilizes alternate vectors that are offset from a septa (e.g., wall) center by a half a vector distance in an opposite direction. For example, 3D printing may be utilized to print a collimator (e.g., made of multiple layers) for use with an X-ray detector of an X-ray imaging system, wherein the 3D printing is utilized for alternately printing layers of a first set of septa of the collimator extending in a first direction by alternating between utilizing a first vector and a second vector in printing the layers of the first set of septa. The first and second vector are oriented in opposite directions along the first direction, disposed on opposite sides of a first center line of a respective septa of the first set of septa, and offset from the first center line half of first distance (e.g., vector distance) of a first width of the respective septa of the first set of septa. The 3D printing is also utilized for alternately printing layers of a second set of septa of the collimator extending in a second direction by alternating between utilizing a third vector and a fourth vector in printing the layers of the second set of septa. The third vector and the fourth vector are oriented in opposite directions along the second direction and disposed on opposite sides of a second center line of a respective septa of the second set of septa, and offset from the second center line half of a second distance of a second width of the respective septa of the second set of septa. The first direction is orthogonal to the second direction. This creates an article (i.e., the collimator) (where a conventional process would require a multi-vector strategy for a given thickness (i.e., greater than 100 micrometers)) having a smoother finish and a higher density. The disclosed techniques also improve productivity, unifies septa characteristics, and enables the printing of symmetrical walls. In addition, the disclosed techniques improve measurement capabilities when utilizing the collimator due to the use of backlight and the smoother finish which helps with edge detection. Further, the disclosed techniques reduce cleaning time and reduce/remove the appearance of residual particles stuck to the septa surface.

With the preceding discussion in mind, FIG. 1 illustrates an embodiment of an imaging system 10 for acquiring and processing image data in accordance with structures and approaches discussed herein. That is, the depicted type of imaging system 10 is an example of one type of imaging system that may benefit from or otherwise utilize components made in accordance with the techniques described herein (e.g., multiple layer X-ray gratings such as an anti-scatter grid or collimator). Though, as noted herein, other types of systems (e.g., non-imaging systems, non-medical systems, and so forth) may also utilize components made in accordance with the techniques described herein.

In the illustrated example, system 10 is a computed tomography (CT) system designed to acquire X-ray projection data and to reconstruct the projection data into volumetric reconstructions for display and analysis. The CT imaging system 10 includes one or more X-ray sources 12, such as one or more X-ray tubes or solid state emission structures which allow X-ray generation at one or more energy spectra during an imaging session.

In certain implementations, the source 12 may be positioned proximate to a pre-patient collimator and/or filter assembly 22 that may be used to steer the X-ray beam 20, to define the shape (such as by limiting off-angle emissions) and/or extent of a high-intensity region of the X-ray beam 20, to control or define the energy profile of the X-ray beam 20, and/or to otherwise limit X-ray exposure on those portions of the patient 24 not within a region of interest. In practice, the filter assembly or beam shaper 22 may be incorporated within the gantry, between the source 12 and the imaged volume.

The X-ray beam 20 passes into a region in which the subject (e.g., a patient 24) or object of interest (e.g., manufactured component, baggage, package, and so forth) is positioned. The subject attenuates at least a portion of the X-ray photons 20, resulting in attenuated X-ray photons 26 that impinge upon a pixelated detector array 28 formed by a plurality of detector elements (e.g., pixels) arranged in an array. In the depicted example, the attenuated X-ray photons 26 pass through a collimator 18 (e.g., an anti-scatter grid) prior to reaching the detector array 28. As discussed herein, the collimator 18 may consist of a plurality of blades or other elements aligned substantially perpendicular to the surface of the detector array 28 and formed from an attenuating material that limit or prevent X-ray photons 26 traveling at off-angles (e.g., scattered X-rays) from reaching the detector array 28. The electrical signals reaching the detector array 28 are detected and processed to generate one or more projection datasets. In the depicted example, the detector 28 is coupled to the system controller 30, which commands acquisition of the digital signals generated by the detector 28.

A system controller 30 commands operation of the imaging system 10 to execute filtration, examination and/or calibration protocols, and may process the acquired data. With respect to the X-ray source 12, the system controller 30 furnishes power, focal spot location, control signals and so forth, for the X-ray examination sequences. In accordance with certain embodiments, the system controller 30 may control operation of the filter assembly 22, the CT gantry (or other structural support to which the X-ray source 12 and detector 28 are attached), and/or the translation and/or inclination of the patient support over the course of an examination.

In addition, the system controller 30, via a motor controller 36, may control operation of a linear positioning subsystem 32 and/or a rotational subsystem 34 used to move the subject 24 and/or components of the imaging system 10, respectively. For example, in a CT system, the radiation source 12 and detector 28 rotate about the object (e.g., patient 24) to acquire X-ray transmission data over a range of angular views. Thus, in a real-world implementation, the imaging system 10 is configured to generate X-ray transmission data corresponding to each of the plurality of angular positions (e.g., 360°, 180°+a fan beam angle (α), and so forth) covering an entire scanning area of interest.

The system controller 30 may include signal processing circuitry and associated memory circuitry. In such embodiments, the memory circuitry may store programs, routines, and/or encoded algorithms executed by the system controller 30 to operate the imaging system 10, including the X-ray source 12 and/or filter assembly 22, and to process the digital measurements acquired by the detector 28. In one embodiment, the system controller 30 may be implemented as all or part of a processor-based system.

The source 12 may be controlled by an X-ray controller 38 contained within the system controller 30. The X-ray controller 38 may be configured to provide power, timing signals, and/or focal spot size and spot locations to the source 12. In addition, in some embodiments the X-ray controller 38 may be configured to selectively activate the source 12 such that tubes or emitters at different locations within the system 10 may be operated in synchrony with one another or independent of one another or to switch the source between different energy profiles during an imaging session.

The system controller 30 may include a data acquisition system (DAS) 40. The DAS 40 receives data collected by readout electronics of the detector 28, such as digital signals from the detector 28. The DAS 40 may then convert and/or process the data for subsequent processing by a processor-based system, such as a computer 42. In certain implementations discussed herein, circuitry within the detector 28 may convert analog signals of the detector to digital signals prior to transmission to the data acquisition system 40. The computer 42 may include or communicate with one or more non-transitory memory devices 46 that can store data processed by the computer 42, data to be processed by the computer 42, or instructions to be executed by image processing circuitry 44 of the computer 42. For example, a processor of the computer 42 may execute one or more sets of instructions stored on the memory 46, which may be a memory of the computer 42, a memory of the processor, firmware, or a similar instantiation. By way of example, the image processing circuitry 44 of the computer 42 may be configured to generate a diagnostic image.

The computer 42 may also be adapted to control features enabled by the system controller 30 (i.e., scanning operations and data acquisition), such as in response to commands and scanning parameters provided by an operator via an operator workstation 48. The system 10 may also include a display 50 coupled to the operator workstation 48 that allows the operator to view relevant system data, imaging parameters, raw imaging data, reconstructed data or images, and so forth. Additionally, the system 10 may include a printer 52 coupled to the operator workstation 48 and configured to print any desired measurement results. The display 50 and the printer 52 may also be connected to the computer 42 directly (as shown in FIG. 1) or via the operator workstation 48. Further, the operator workstation 48 may include or be coupled to a picture archiving and communications system (PACS) 54. PACS 54 may be coupled to a remote system or client 56, radiology department information system (RIS), hospital information system (HIS) or to an internal or external network, so that others at different locations can gain access to the image data.

Figure 2:
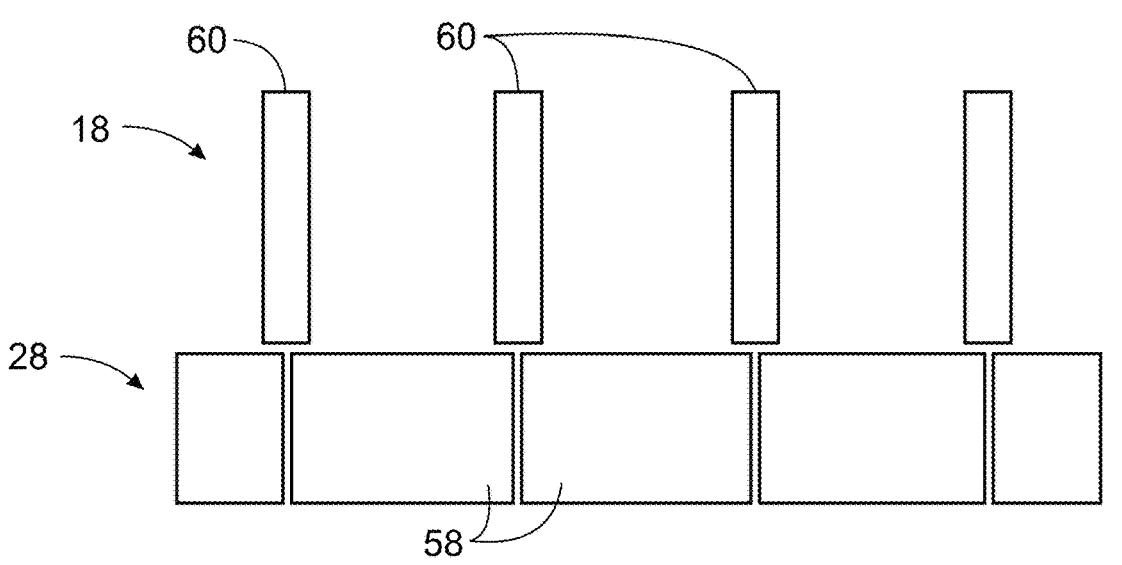
FIG. 2 depicts schematically a side-view of channels of a detector on which collimator blades are disposed, in accordance with certain aspects of the present disclosure.

With the preceding discussion of an overall imaging system 10 in mind, and turning to FIG. 2, an example of the detector 28 and collimator 18 arrangement is shown in a cut-away side view. In this example, the detector 28 is shown as including an array of pixels 58 each corresponding to a readout channel. A set of collimator blades 60 of the collimator 18 are shown associated with the array of pixels 58 such that each pixel is separately collimated. The blades 60 are shown as being placed at where pixels are joined, such that shadowing attributable to the blades 60 is primarily at these joints, leaving the majority of the active area of the pixels 58 relatively free of shadows produced by the blades. In this manner, each pixel 58 is effected relatively consistently and uniformly by the collimator blades 60.

Figure 3:
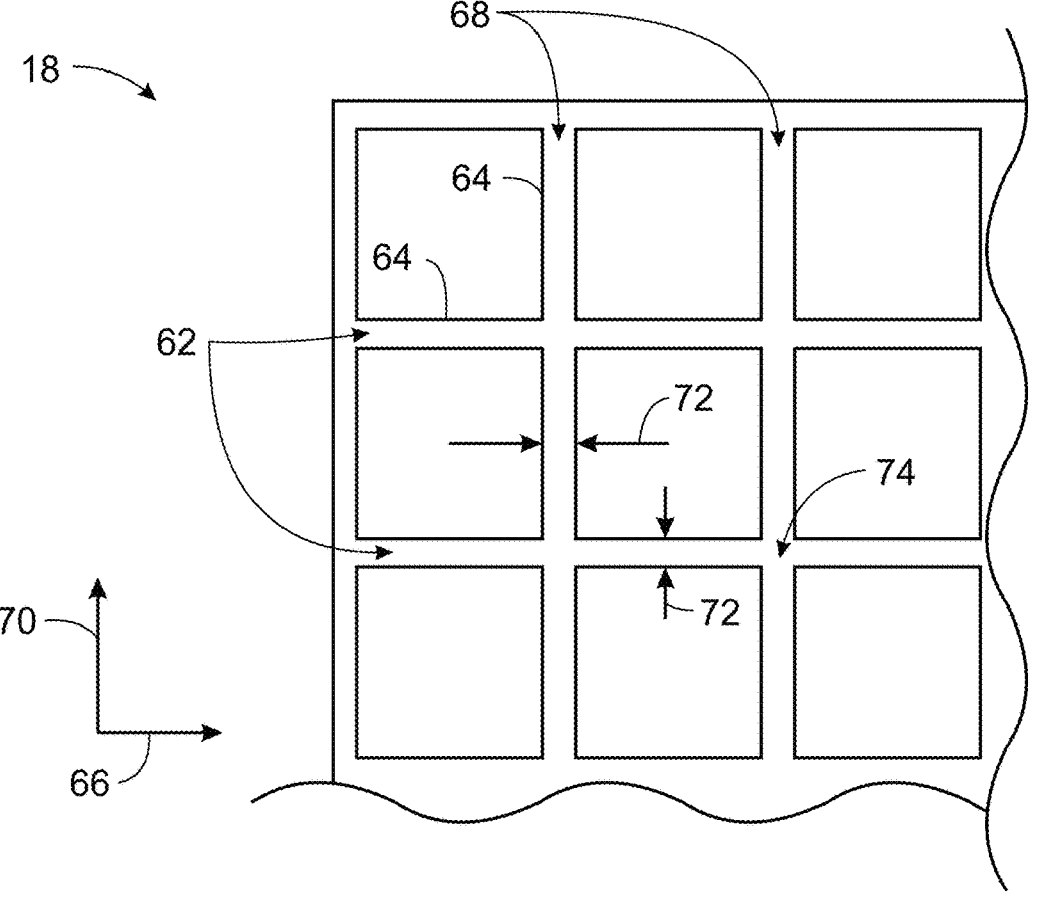
FIG. 3 depicts a top view of a portion of a collimator, in accordance with certain aspects of the present disclosure.

FIG. 3 depicts a top view of a portion of the collimator 18 (e.g., metallic grid structure). As depicted, the collimator 18 includes a first set 62 of septa 64 (e.g., walls) extending in a first direction 66. The collimator 18 also includes a second set 68 of septa 64 (e.g., walls) extending in a second direction 70 orthogonal to the first direction 66. Each septum 64 of both the first set 62 of septa 64 and the second set 68 of septa 64 has a width 72 (e.g., thickness) extending in the second direction 70 and the first direction 66, respectively. In certain embodiments, the width 72 is greater than 100 micrometers. The first set 62 of septa 64 and the second set 68 of septa 64 intersect or meet to form a joint or intersection 74. In certain embodiments, the collimator 18 in FIGS. 2 and 3 may be 3D printed and formed of multiple layers as described in greater detail below. In certain embodiments, the collimator 18 of FIGS. 2 and 3 may be made of tungsten.

Figure 4:
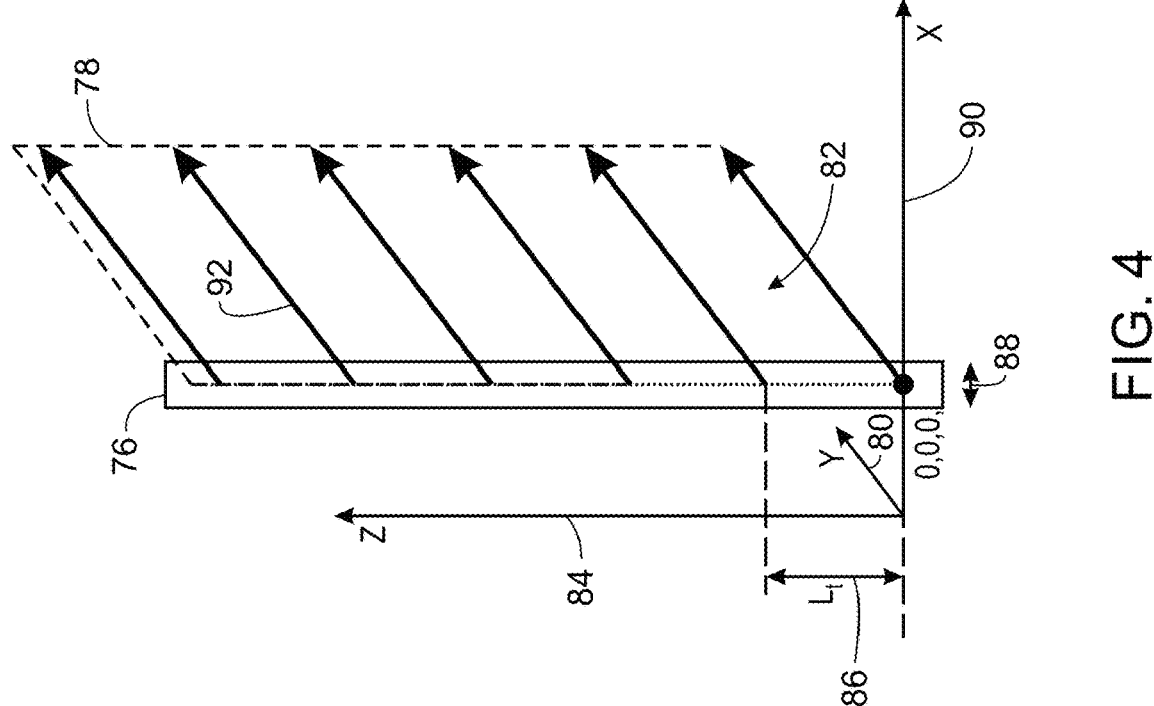
FIG. 4 depicts schematically a conventional printing strategy (e.g., utilizing a single vector) for printing a wall or septum of a collimator.

FIG. 4 depicts schematically a conventional printing strategy (e.g., utilizing a single vector) for printing a wall or septum of a collimator. As depicted in FIG. 4, vertical box 76 represents a wall or septum of a collimator that extends in a direction 80 (e.g., Y-direction). The wall or septum 76 includes a center line 78. The wall or septum 76 is 3D printed in multiple layers 82 with each layer 82 printed as a laser patch on top of the other layers 82 so that the wall or septum 76 extends in a direction 84 (e.g., Z-direction). Each layer 82 includes a layer thickness 86 (e.g., $L_t$) in the direction 84. The wall or septum 76 includes a width 88 (e.g., wall thickness) extending in a direction 90 (e.g., X-direction) orthogonal to the direction 80. The width 88 is 100 micrometers or less. The center line 78 is centrally located within the width 88. The individual layers 82 of the wall or septum 76 are printed as a single vector exposure 92 (e.g., with a thickness of 100 micrometers or less) in the direction 80.

Figure 5:
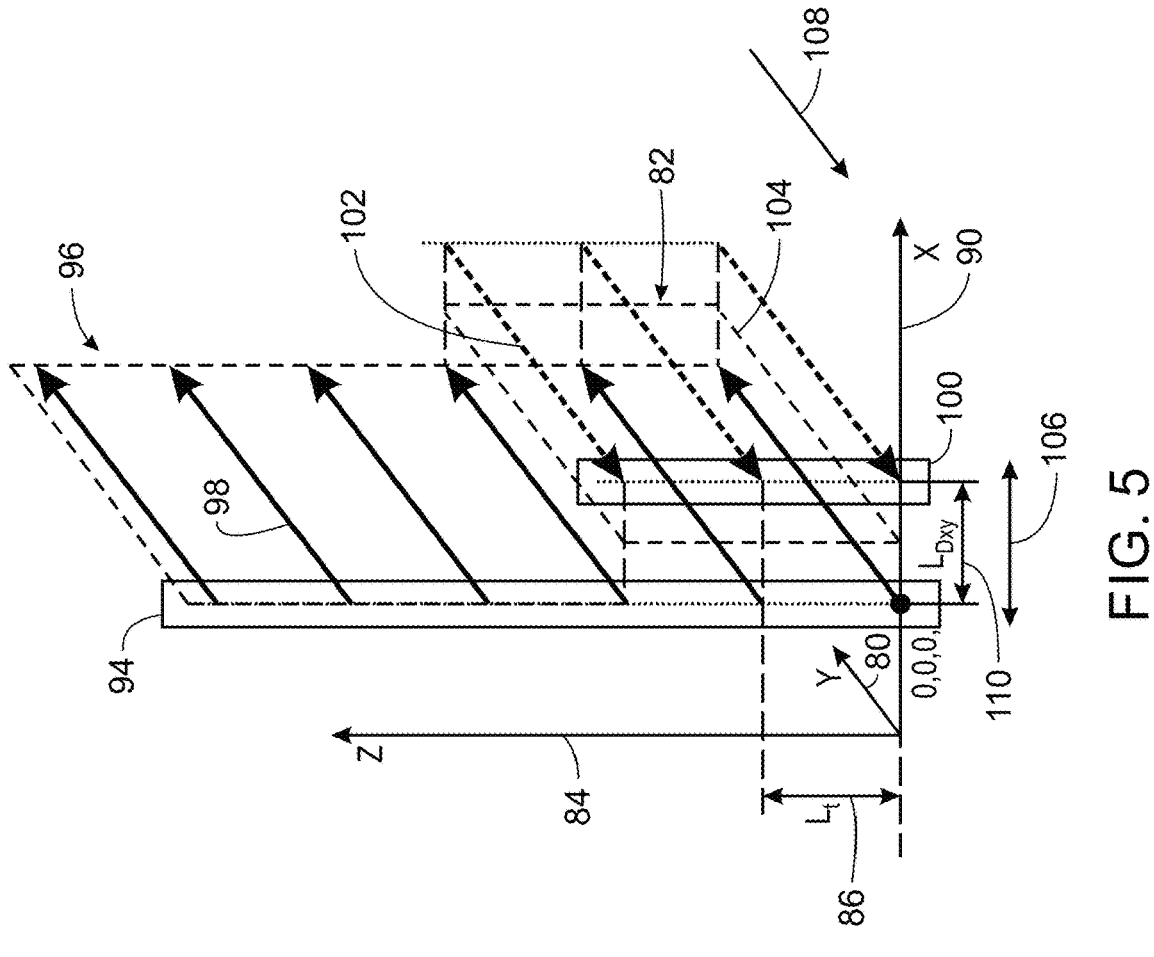
FIG. 5 depicts schematically a conventional printing strategy (e.g., utilizing a two vector strategy) for printing a wall or septum of a collimator.

A different strategy needs to be utilized if a wall or septum of a collimator has a wall thickness greater than 100 micrometers. FIG. 5 depicts schematically a conventional printing strategy (e.g., utilizing a two vector strategy) for printing a wall or septum of a collimator. As depicted in FIG. 5, a vertical box 94 represents a portion of a wall or septum 96 of a collimator that extends in the direction 80 (e.g., Y-direction) printed utilizing a first vector exposure 98 (e.g., with a thickness of 100 micrometers or less). A vertical box 100 represent a portion of the wall or septum 96 printed utilizing a second vector exposure 102 (e.g., with a thickness greater than 100 micrometers). The wall or septum 96 includes a center line 104. The wall or septum 96 is 3D printed in multiple layers 82 with each layer 82 printed as a laser patch on top of the other layers 82 (of the same vector exposure) so that the wall or septum 96 extends in the direction 84 (e.g., Z-direction). Each layer 82 includes the layer thickness 86 (e.g., $L_t$) in the direction 84. The wall or septum 96 includes a width 106 (e.g., wall thickness) extending in the direction 90 (e.g., X-direction) orthogonal to the direction 80. The width 106 is greater than 140 micrometers. The center line 78 is centrally located within the width 106. The individual layers 82 of the wall or septum 96 are printed utilizing two adjacent vectors, the first vector exposure 98 in the direction 80 and the second vector exposure 102 in a direction 108 opposite the direction 80. The portion 94 of the wall or septum 96 is formed by printing layers 82 as a laser patch utilizing the first vector exposure 98 on top of each other to form the portion 94. The portion 100 of the wall or septum 96 is formed by printing layers 82 as a laser patch utilizing the second vector exposure 102 on top of each other to form the portion 100. In particular, each layer of the wall 96 is printed via the first vector exposure 98 and the second vector exposure 102. A vector distance 110 (e.g., $L_{Dxy}$) represents a distance along the direction 90 between the first vector exposure 98 and the second vector exposure 102.

The printing strategy in FIG. 4 works well for printing walls or septa of a collimator that are smaller than 100 micrometers. However, when walls or septa of a collimator are larger than 100 micrometers, then a multi-vector strategy (for printing individual layers) as depicted in FIG. 5 is utilized which leads to the following issues or problems. These issues include increased surface roughness and reduced wall density relative to design (desired) wall density. These issues also include asymmetrical wall characteristics (e.g., more roughness and less density in the second vector patch). These issues further include that measured wall thickness does not represent the designed wall thickness. In particular, residual particles on septa surfaces and porosity usually lead to thicker wall but a reduced density, all of which decreases collimator performance. These issues further even further include longer postprocessing (e.g., ultrasonic cleaning to remove particles loosely connected to the septa surfaces).

Figure 6:
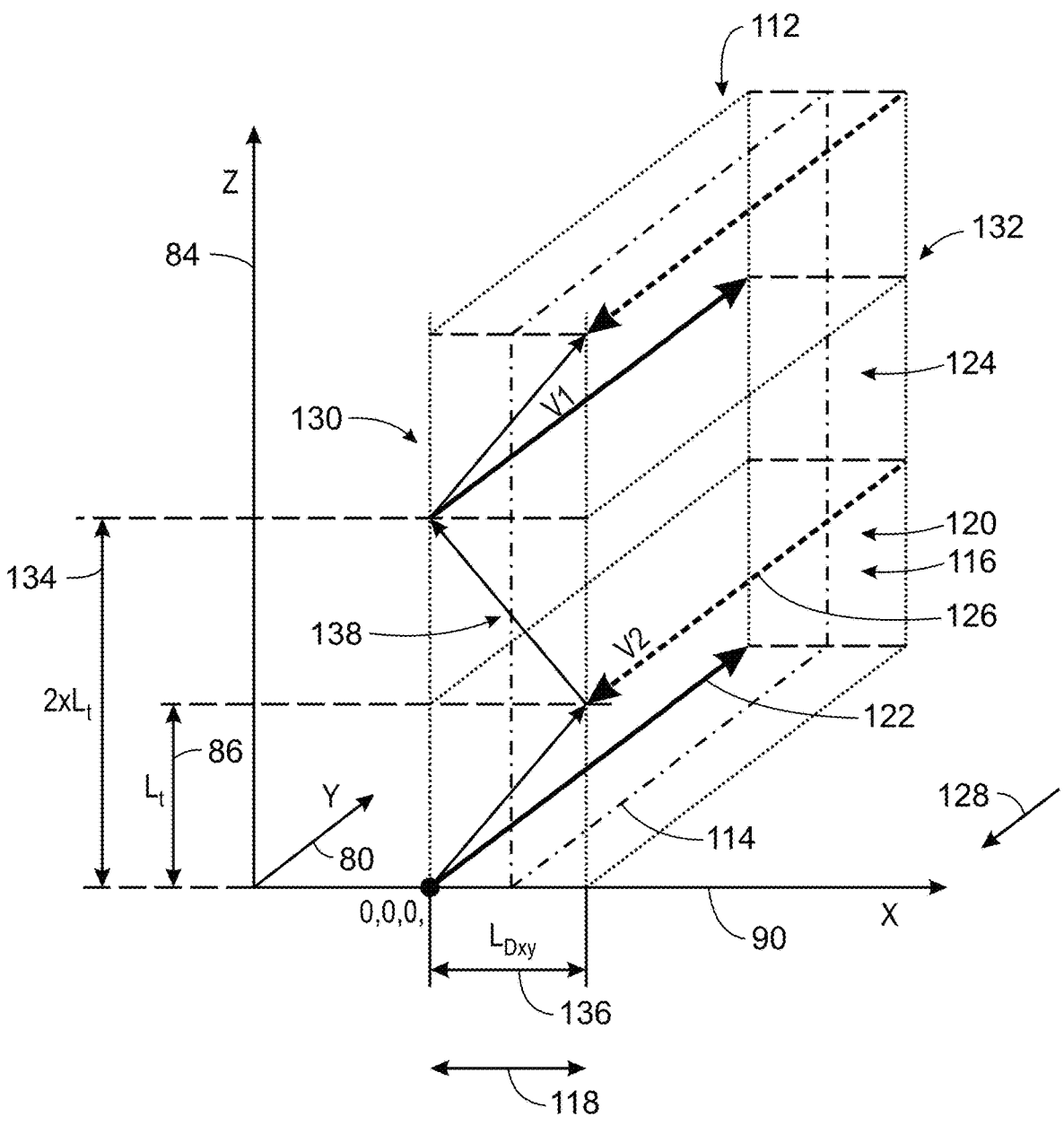
FIG. 6 depicts schematically a zig-zag printing strategy (e.g., utilizing a single vector printing strategy) for printing a wall or septum of a collimator, in accordance with aspects of the present disclosure.

The following provides a zig-zag printing strategy utilizing a single vector printing strategy that can be utilized in 3D printing (e.g., via LPBF) of a collimator (e.g., made of tungsten) having septa or walls with a wall thickness of greater than 100 micrometers. FIG. 6 depicts schematically a zig-zag printing strategy (e.g., utilizing a single vector printing strategy) for printing a wall or septum 112 of a collimator or a section of the wall or septum 112. As depicted in FIG. 6, the wall or septum 112 of the collimator extends in the direction 80 (e.g., Y-direction). The wall or septum 112 includes a center line 114. The wall or septum 112 is 3D printed in multiple layers 116 with each layer 116 printed as a laser patch on top of the other layers 116 so that the wall or septum 112 extends in the direction 84 (e.g., Z-direction). Each layer 116 includes the layer thickness 86 (e.g., Lt) in the direction 84. The wall or septum 112 includes a width 118 (e.g., wall thickness) extending in the direction 90 (e.g., X-direction) orthogonal to the direction 80. The width 118 is greater than 100 micrometers. The center line 114 is centrally located within the width 118. The individual layers 116 of the wall or septum 112 are alternately printed utilizing two different vectors (e.g., with a single vector per layer 116). As depicted, an initial layer 120 (layer n) is printed along a first vector 122 (V1) in a first direction (i.e., the Y-direction 80) utilizing the first vector exposure. The first vector 122 is offset from the center line 114 by half of a distance of the width 118 (or vector distance 136). The next layer 124 (layer n+1) is printed along a second vector 126 (V2) as a laser patch on the initial layer 120 in a second direction 128 opposite the first direction 80 utilizing the second vector exposure. The second vector 126 is offset from the center line 114 by half of a distance of the width 118 (or vector distance 136). The first vector 122 and the second vector 126 are disposed on opposite sides 130, 132, respectively, of the center line 114. The layer 124 has the same thickness as the initial layer 120. The layers 120, 124 together have a layer thickness 134 ($2 \times L_t$). A vector distance 136 (e.g., $L_{Dxy}$) represents a distance along the direction 90 between the first vector 122 and the second vector 126. The vector distance 136 represents the distance in shifting between the first vector 122 and the second vector 126 to print the respective layers 116. The vector distance 136 is determined based on a combination of laser power and laser speed to achieve the expected printing result. In this case, the vector distance 136 is the same as the width 118 of the wall 112. In certain embodiments, vectors of different directions may be utilized in printing a layer of a septum or wall to improve density and surface finish of a printed collimator. In certain embodiments, different vectors may be utilized for different (and adjacent) sections of the wall or septum on the same layer, where a single vector is utilized on each section of the wall or septum.

As depicted in FIG. 6, the layers 116 are alternately printed by alternating between utilizing the first vector 122 and the second vector 126 for printing a respective layer 116. This alternating use of the first vector 122 and the second vector results in a zig-zag pattern 138 in the direction 84. The utilization of the zig-zag strategy improves productivity, improves collimator surface finish and improves wall density up to 99.9 percent (excluding cracks). The utilization of the zig-zag strategy also unifies septa characteristics and enables the printing of symmetrical walls. The utilization of the zig-zag strategy further provides measurement capability improvements (e.g., using backlight and a smoother surface finish helps with edge detection). The utilization of the zig-zag strategy further reduces cleaning time and reduces or removes the appearance of residual particles stuck to septa surfaces. In sum, the utilization of the zig-strategy enables faster printing with a better quality that meet critical to quality standards.

Figures 7, 8:
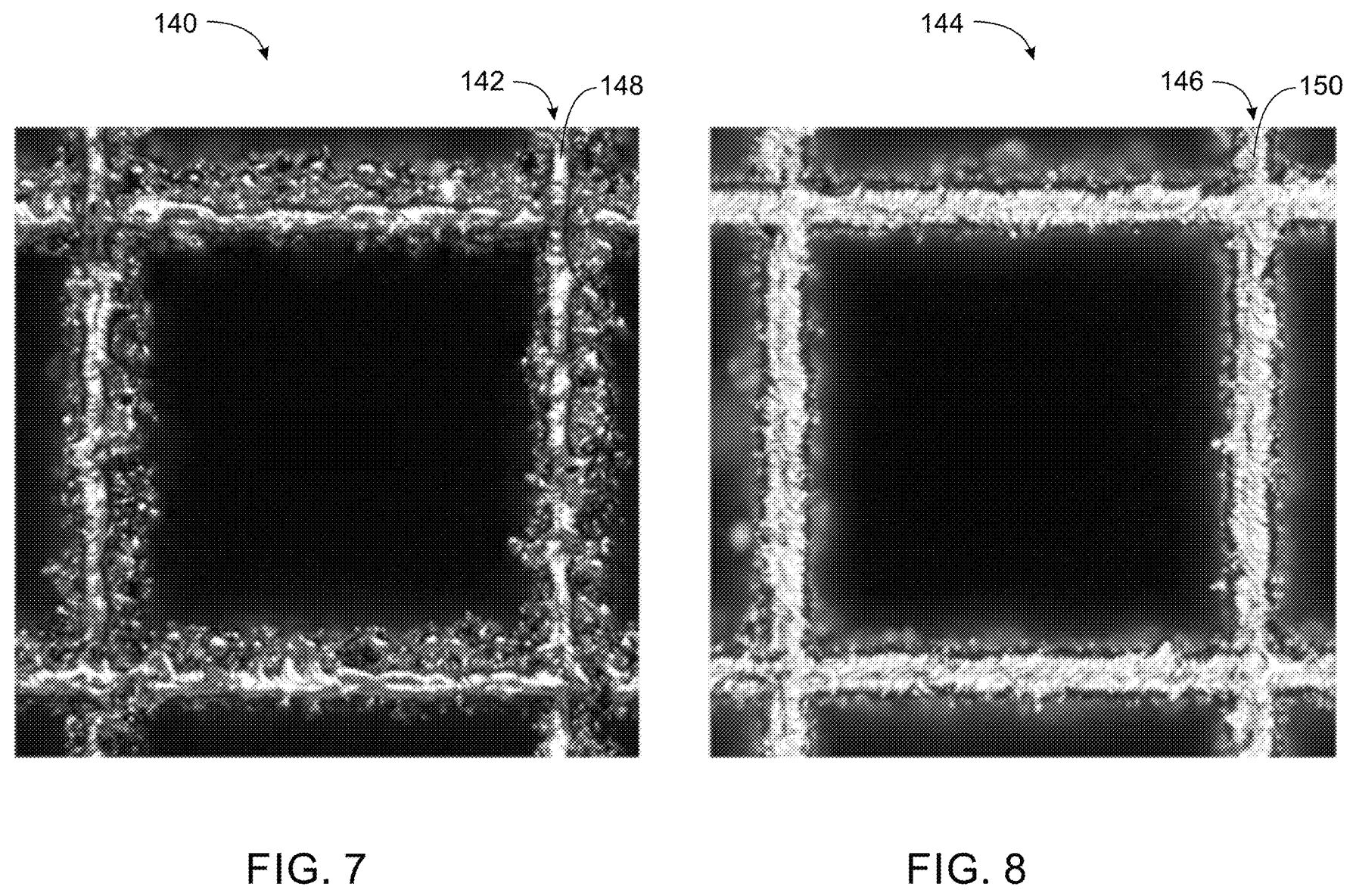

FIGS. 7 and 8 illustrate the differences between collimators printed with conventional and customized zig-zag printing strategies. FIG. 7 depicts an image 140 from above of a portion of a collimator 142 printed utilizing the conventional printing strategy (e.g., two vector strategy in FIG. 5). FIG. 8 depicts an image 144 from above of a portion of collimator 146 printed utilizing the zig-zag printing strategy in FIG. 6 (and/or FIGS. 9 and/or 10). As depicted in the image 140, walls 148 of the collimator 142 have visible asymmetry. In addition, the walls 148 of the collimator 142 are rough and have density issues. In contrast, as depicted in the image 144, walls 150 of the collimator 146 are more asymmetrical. In addition, the walls 150 are denser and smoother. Further, the walls 150 have fewer residual particles. The target wall thickness for both of the collimators 142, 146 was 150 micrometers.

Figure 9:
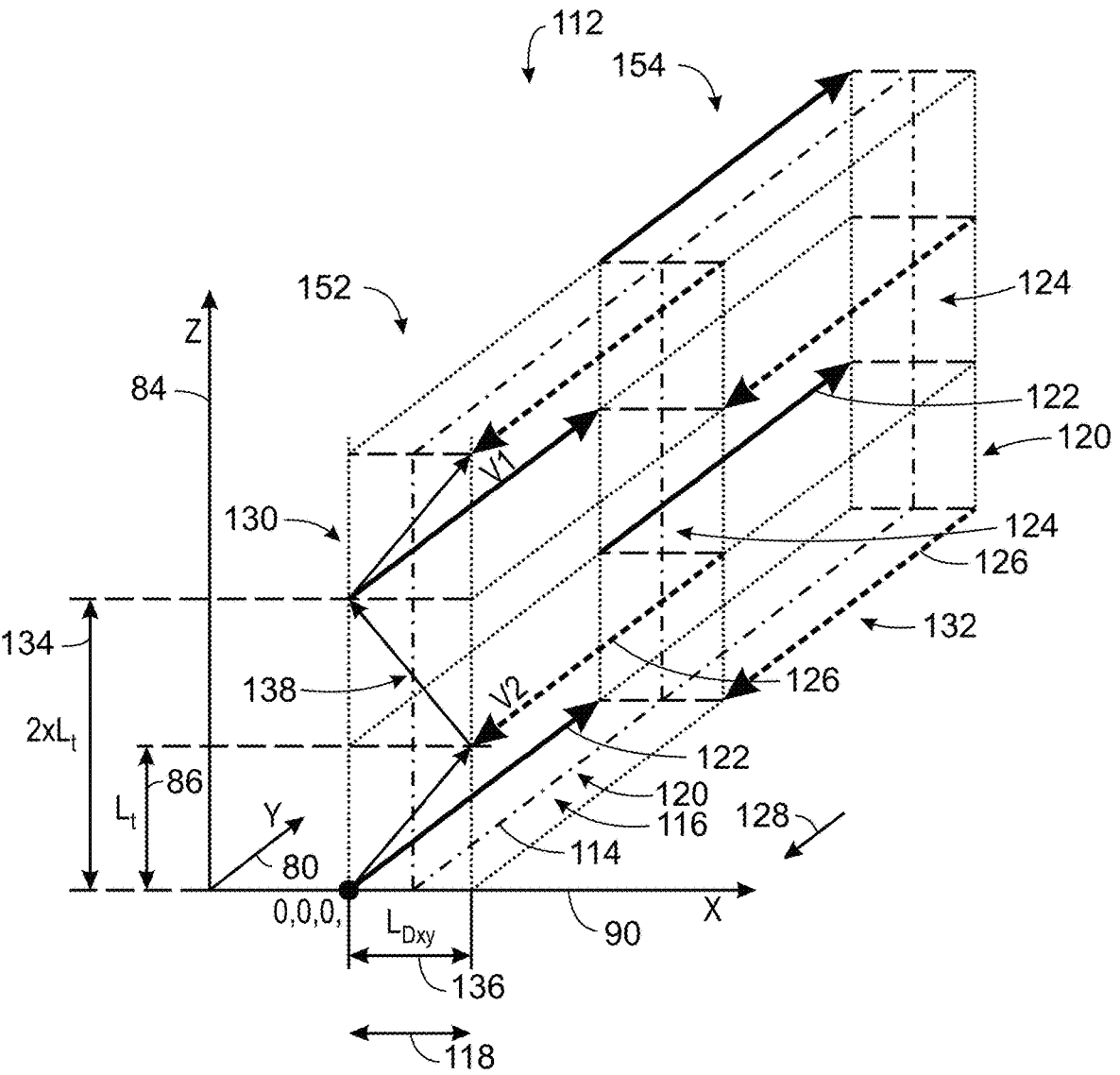
FIG. 9 depicts schematically a zig-zag printing strategy (e.g., utilizing alternate vectors printing strategy) for printing a wall or septum of a collimator, in accordance with aspects of the present disclosure.

As mentioned above, multiple vectors may be utilized in 3D printing (e.g., via LPBF) of a collimator (e.g., made of tungsten) having septa or walls with a wall thickness of greater than 100 micrometers. FIG. 9 depicts schematically a zig-zag printing strategy (e.g., utilizing alternate vectors printing strategy) for printing the wall or septum of a collimator. As depicted in FIG. 9, the wall or septum 112 of the collimator extends in the direction 80 (e.g., Y-direction). In particular, the wall or septum 112 is printed in two portions or sections 152 and 154. The portions 152 and 154 are printed adjacent to each other and are aligned in the direction 80. The printing of the portion 152 utilizes a zig-zag printing strategy alternating between two vectors in printing the layers of the portion 152. The printing of the portion 154 utilizes a zig-zag printing strategy alternating between the same two vectors (utilized in printing the portion 152) in printing the layers of the portion 154 but utilizing the two vectors in a different order.

The wall or septum 112 includes the center line 114 for both portions 152 and 154. The portion 152 is 3D printed in multiple layers 116 with each layer 116 printed as a laser patch on top of the other layers 116 so that the portion 152 extends in the direction 84 (e.g., Z-direction). Each layer 116 includes the layer thickness 86 (e.g., Lt) in the direction 84. The portion 152 includes the width 118 (e.g., wall thickness) extending in the direction 90 (e.g., X-direction) orthogonal to the direction 80. The width 118 is greater than 100 micrometers. The center line 114 is centrally located within the width 118. The individual layers 116 of the portion 152 are alternately printed utilizing two different vectors (e.g., with a single vector per portion of the layer 116). As depicted, the initial layer 120 (layer n) of the portion 152 is printed along the first vector 122 (V1) in the first direction (i.e., the Y-direction 80) utilizing the first vector exposure. The first vector 122 is offset from the center line 114 by half of a distance of the width 118 (or vector distance 136). The next layer 124 (layer n+1) of the portion 152 is printed along the second vector 126 (V2) as a laser patch on the initial layer 120 in the second direction 128 opposite the first direction 80 utilizing the second vector exposure. The second vector 126 is offset from the center line 114 by half of a distance of the width 118 (or vector distance 136). The first vector 122 and the second vector 126 are disposed on opposite sides 130, 132, respectively, of the center line 114 in printing the portion 152. The layer 124 has the same thickness as the initial layer 120. The layers 120, 124 of the portion 152 together have a layer thickness 134 ($2 \times L_t$). The vector distance 136 (e.g., $L_{Dxy}$) represents a distance along the direction 90 between the first vector 122 and the second vector 126. The vector distance 136 represents the distance in shifting between the first vector 122 and the second vector 126 to print the respective layers 116 of the portion 152. The vector distance 136 is determined based on a combination of laser power and laser speed to achieve the expected printing result. In this case, the vector distance 136 is the same as the width 118 of the wall 112.

The portion 154 is 3D printed in multiple layers 116 (corresponding to same layers 116 in the portion 152) with each layer 116 printed as a laser patch on top of the other layers 116 so that the portion 154 extends in the direction 84 (e.g., Z-direction). Each layer 116 of the portion 154 also includes the same layer thickness 86 (e.g., Lt) in the direction 84. The portion 154 includes the same width 118 (e.g., wall thickness) as the portion 152 extending in the direction 90 (e.g., X-direction) orthogonal to the direction 80. The individual layers 116 of the portion 154 are alternately printed utilizing the same two different vectors (e.g., with a single vector per portion of the layer 116) utilized in printing the portion 152. As depicted, the initial layer 120 (layer n) of the portion 154 is printed along the second vector 126 (V2) in the second direction 128 opposite the first direction 80 utilizing the second vector exposure. The second vector 126 is offset from the center line 114 by half of a distance of the width 118 (or vector distance 136). The next layer 124 (layer n+1) of the portion 154 is printed along the first vector 122 (V1) as a laser patch on the initial layer 120 in the first direction 80 utilizing the first vector exposure. The first vector 122 is offset from the center line 114 by half of a distance of the width 118 (or vector distance 136). The first vector 122 and the second vector 126 are disposed on opposite sides 130, 132, respectively, of the center line 114 in printing the portion 154. The layer 124 has the same thickness as the initial layer 120. The layers 120, 124 of the portion 154 together have the same layer thickness 134 (2×L$_t$) as the portion 152. The vector distance 136 (e.g., L$_{Dxy}$) represents a distance along the direction 90 between the first vector 122 and the second vector 126. The vector distance 136 represents the distance in shifting between the first vector 122 and the second vector 126 to print the respective layers 116 of the portion 152. The vector distance 136 is determined based on a combination of laser power and laser speed to achieve the expected printing result. In this case, the vector distance 136 is the same as the width 118 of the wall 112. This printing strategy of utilizing alternate vectors in printing adjacent portions of the wall 112 reduces residual stresses and increase quality of the wall 112.

Figure 10:
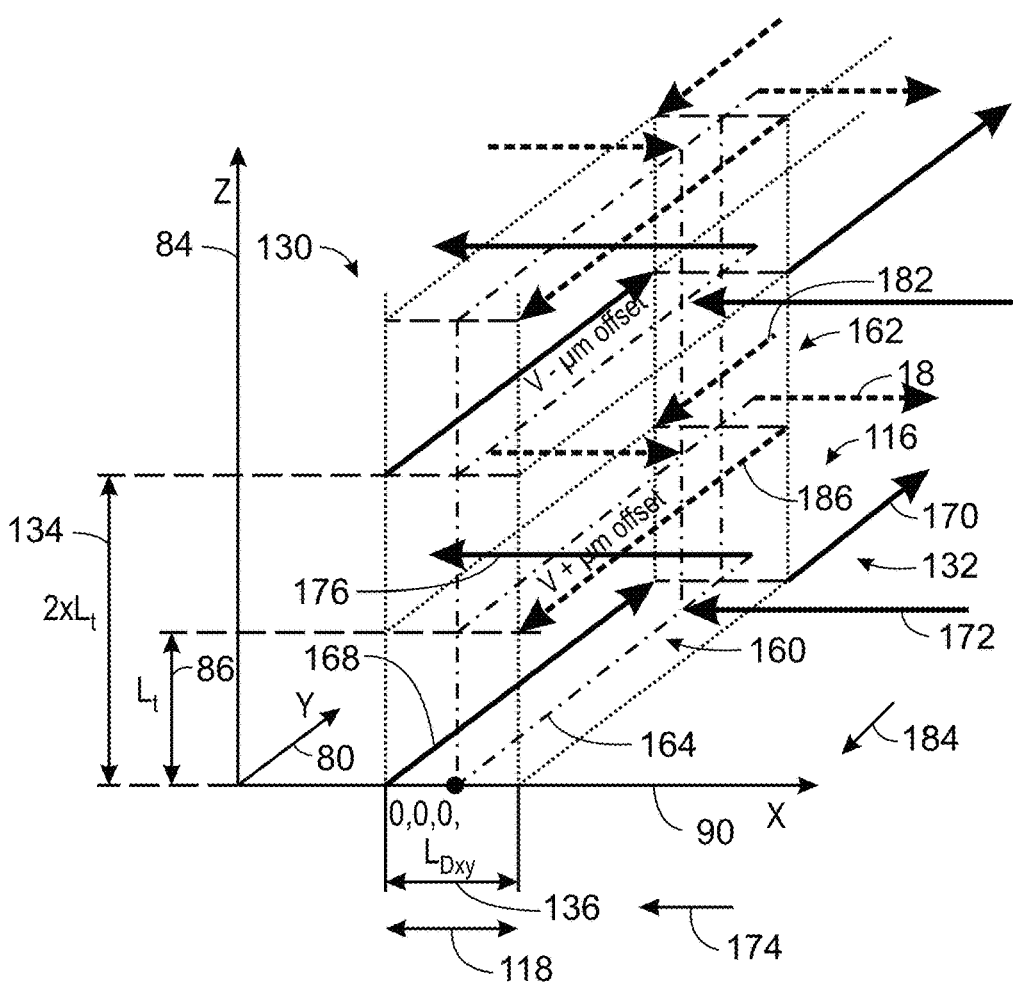
FIG. 10 depicts schematically an overall zig-zag printing strategy for forming joints between intersecting walls or septa of a collimator, in accordance with aspects of the present disclosure.
Figure 11:
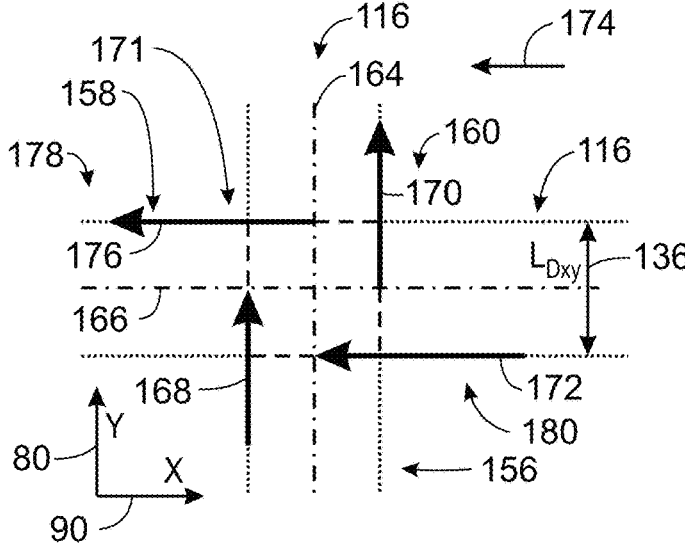
FIG. 11 depicts schematically a top view of a printing strategy for printing an initial layer of the walls or septa in FIG. 10, in accordance with aspects of the present disclosure.
Figure 12:
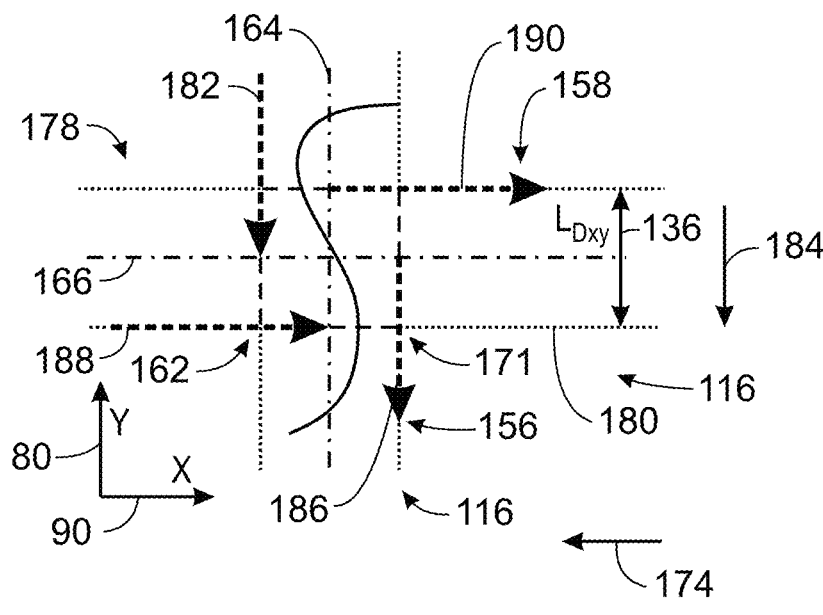
FIG. 12 depicts schematically a top view of a printing strategy for printing a next layer of the walls or septa in FIG. 10, in accordance with aspects of the present disclosure.
Figure 13:
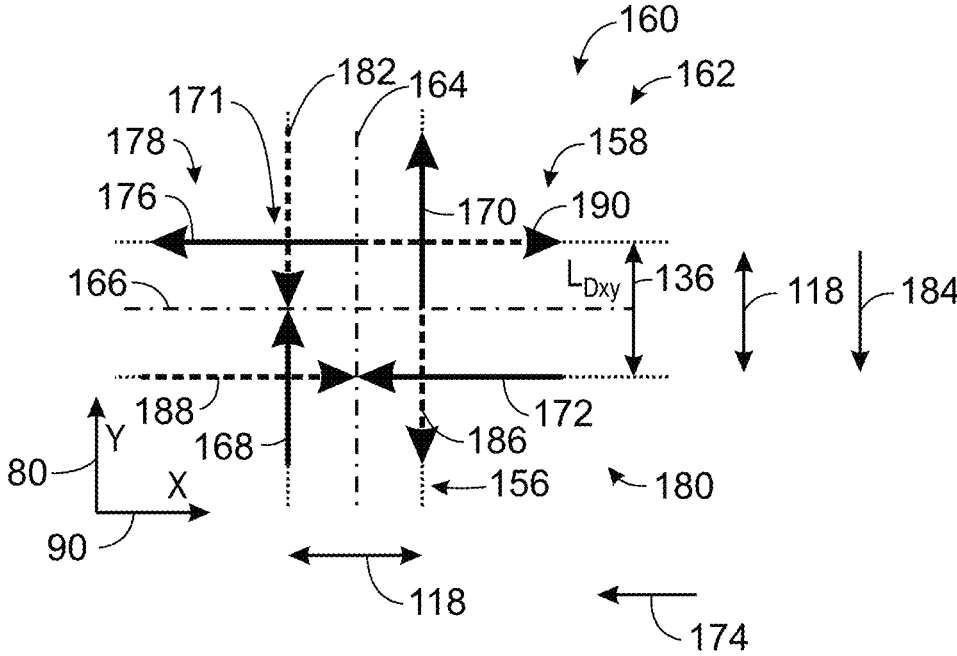
FIG. 13 depicts schematically a top view of the printing strategies for the printing of the initial layer and next layer of the walls or septa in FIG. 10 overlapped, in accordance with aspects of the present disclosure.

As mentioned above, partial vectors may be utilized in 3D printing (e.g., via LPBF) of a collimator (e.g., made of tungsten) having septa or walls with a wall thickness of greater than 100 micrometers, where the partial vectors enable the formation of joints or intersections between intersecting or orthogonal walls of the collimator. FIG. 10 depicts schematically an overall zig-zag printing strategy for forming a joint between intersecting walls or septa 156 and 158 of a collimator. FIG. 11 depicts schematically a top view of a printing strategy for printing an initial layer 160 (layer n) of the walls or septa 156 and 158 in FIG. 10. FIG. 12 depicts schematically a top view of a printing strategy for printing a next layer 162 (layer n+1) of the walls or septa 156 and 158 in FIG. 10. FIG. 13 depicts schematically a top view of the printing strategies for the printing of the initial layer 160 and next layer 162 of the walls or septa 156 and 158 in FIG. 10 overlapped.

As depicted in FIGS. 10-13, the wall or septum 156 of the collimator extends in the direction 80 (e.g., Y-direction). The wall or septum 156 includes a center line 164. As depicted in FIGS. 11-13, the wall or septum 158 of the collimator extends in the direction 90 (e.g., X-direction). The wall or septum 158 includes a center line 166. Both walls 156 and 158 are 3D printed in multiple layers 116 with each layer 116 printed as a laser patch on top of the other layers 116 so that the walls or septa 156 and 158 extend in the direction 84 (e.g., Z-direction). Each layer 116 of the walls 156 and 158 includes the layer thickness 86 (e.g., Lt) in the direction 84. The walls 156 and 158 each include the width 118 (e.g., wall thickness) extending in the direction 90 (e.g., X-direction) and the direction 80, respectively, which are orthogonal to each other. The width 118 is greater than 100 micrometers. The center lines 164 and 166 are centrally located within the respective width 118.

The individual layers 116 of each wall 156 and 158 are alternately printed utilizing different vectors (with a single vector per section of a particular layer 116). As depicted in FIGS. 10, 11 and 13, the initial layer 160 (layer n) for wall 156 is printed along a first vector 168 in a first direction (i.e., the Y-direction 80) for a portion of the wall 156 before switching to a second vector 170 in the first direction 80 for another portion of the wall 156. Both the first vector 168 and the second vector 170 are offset from the center line 164 by half of a distance of the width 118 (or vector distance 136 between the first vector 168 and the second vector 170). The first vector 168 and the second vector 170 are disposed on opposite sides 130, 132, respectively, of the center line 164. In certain embodiments, a gap is created in the printing of the wall 156 where the printing switches between the first vector 168 and the second vector 170. Where the printing switches between the first vector 168 and the second vector 170 is where the walls 156 and 158 form a joint 171. The switching between the first vector 168 and the second vector 170 may occur multiple times in the first direction 80 at locations where the wall 156 will form a joint with other walls. The respective areas of the initial layer 160 of the wall 156 with the first vector 168 and the second vector 170 may be considered different adjacent sections of the wall 156 (thus, having a single vector per layer of wall section).

As depicted in FIGS. 10, 11 and 13, the initial layer 160 (layer n) for wall 158 is printed along a third vector 172 in a second direction 174 (i.e., opposite the X-direction 90) for a portion of the wall 158 before switching to a fourth vector 176 in the second direction 174 for another portion of the wall 158. Both the third vector 172 and the fourth vector 176 are offset from the center line 166 by half of a distance of the width 118 (or vector distance 136 between the third vector 172 and the fourth vector 176). The third vector 172 and the fourth vector 176 are disposed on opposite sides 178, 180, respectively, of the center line 166. In certain embodiments, a gap is created in the printing of the wall 158 where the printing switches between the third vector 172 and the fourth vector 176. Where the printing switches between the third vector 172 and the fourth vector 176 is where the walls 156 and 158 form the joint 171. The switching between the third vector 172 and the fourth vector 176 may occur multiple times in the second direction 174 at locations where the wall 158 will form a joint with other walls. The respective areas of the initial layer 160 of the wall 158 with the third vector 172 and the fourth vector 176 may be considered different adjacent sections of the wall 156 (thus, having a single vector per layer of wall section).

The printing of the initial layer 160 of the wall 156 with the first vector 168 and the second vector 170 and the printing of the initial layer 160 of the wall 158 with the third vector 172 and the fourth vector 176 intersect where the joint 171 is formed. In particular, the printing of initial layer 160 of the walls 156 and 158 intersect where the respective vectors utilized for the printing the respective walls 156 and 158. In certain embodiments, to form the joint 171, the printing of the initial layer 160 of the wall 156 fills in a gap where printing of the wall 158 switches between the third vector 172 and the fourth vector 176, while the printing of the initial layer 160 of the wall 158 fills in a gap where printing of the wall 156 switches between the first vector 168 and the second vector 170.

As depicted in FIGS. 10, 12 and 13, the next layer 162 (layer n+1) for wall 156 is printed along a fifth vector 182 in a third direction 184 (i.e., opposite the Y-direction 80) for a portion of the wall 156 before switching to a sixth vector 186 in the third direction 184 for another portion of the wall 156. Both the fifth vector 182 and the sixth vector 186 are offset from the center line 164 by half of a distance of the width 118 (or vector distance 136 between the fifth vector 182 and the sixth vector 186). The fifth vector 182 and the sixth vector 186 are disposed on opposite sides 130, 132, respectively, of the center line 164. In certain embodiments, a gap is created in the printing of the wall 156 where the printing switches between the fifth vector 182 and the sixth vector 186. Where the printing switches between the fifth vector 182 and the sixth vector 186 is where the walls 156 and 158 form the joint 171. The switching between the fifth vector 182 and the sixth vector 186 may occur multiple times in the third direction 184 at locations where the wall 156 will form a joint with other walls. The respective areas of the next layer 162 of the wall 158 with the fifth vector 182 and the sixth vector 186 may be considered different adjacent sections of the wall 158 (thus, having a single vector per layer of wall section).

As depicted in FIGS. 10, 12 and 13, the next layer 162 (layer n+1) for the wall 158 is printed along a seventh vector 188 in a fourth direction (i.e., the X-direction 90) for a portion of the wall 158 before switching to an eighth vector 190 in the fourth direction 90 for another portion of the wall 158. Both the seventh vector 188 and the eighth vector 190 are offset from the center line 166 by half of a distance of the width 118 (or vector distance 136 between the seventh vector 188 and the eighth vector 190). The seventh vector 188 and the eighth vector 190 are disposed on opposite sides 180, 178, respectively, of the center line 166. In certain embodiments, a gap is created in the printing of the wall 158 where the printing switches between seventh vector 188 and the eighth vector 190. Where the printing switches between seventh vector 188 and the eighth vector 190 is where the walls 156 and 158 form the joint 171. The switching between the seventh vector 188 and the eighth vector 190 may occur multiple times in the fourth direction 90 at locations where the wall 158 will form a joint with other walls. The respective areas of the next layer 162 of the wall 158 with the seventh vector 188 and the eighth vector 190 may be considered different adjacent sections of the wall 158 (thus, having a single vector per layer of wall section).

The printing of the next layer 162 of the wall 156 with the fifth vector 182 and the sixth vector 186 and the printing of the initial layer 160 of the wall 158 with the seventh vector 188 and the eighth vector 190 intersect where the joint 171 is formed. In particular, the printing of the next layer 162 of the walls 156 and 158 intersect where the respective vectors utilized for the printing the respective walls 156 and 158. In certain embodiments, to form the joint 171, the printing of the next layer 162 of the wall 156 fills in a gap where printing of the wall 158 switches between the seventh vector 188 and the eighth vector 190, while the printing of the initial layer 160 of the wall 158 fills in a gap where printing of the wall 156 switches between the fifth vector 182 and the sixth vector 186.

Figure 14:
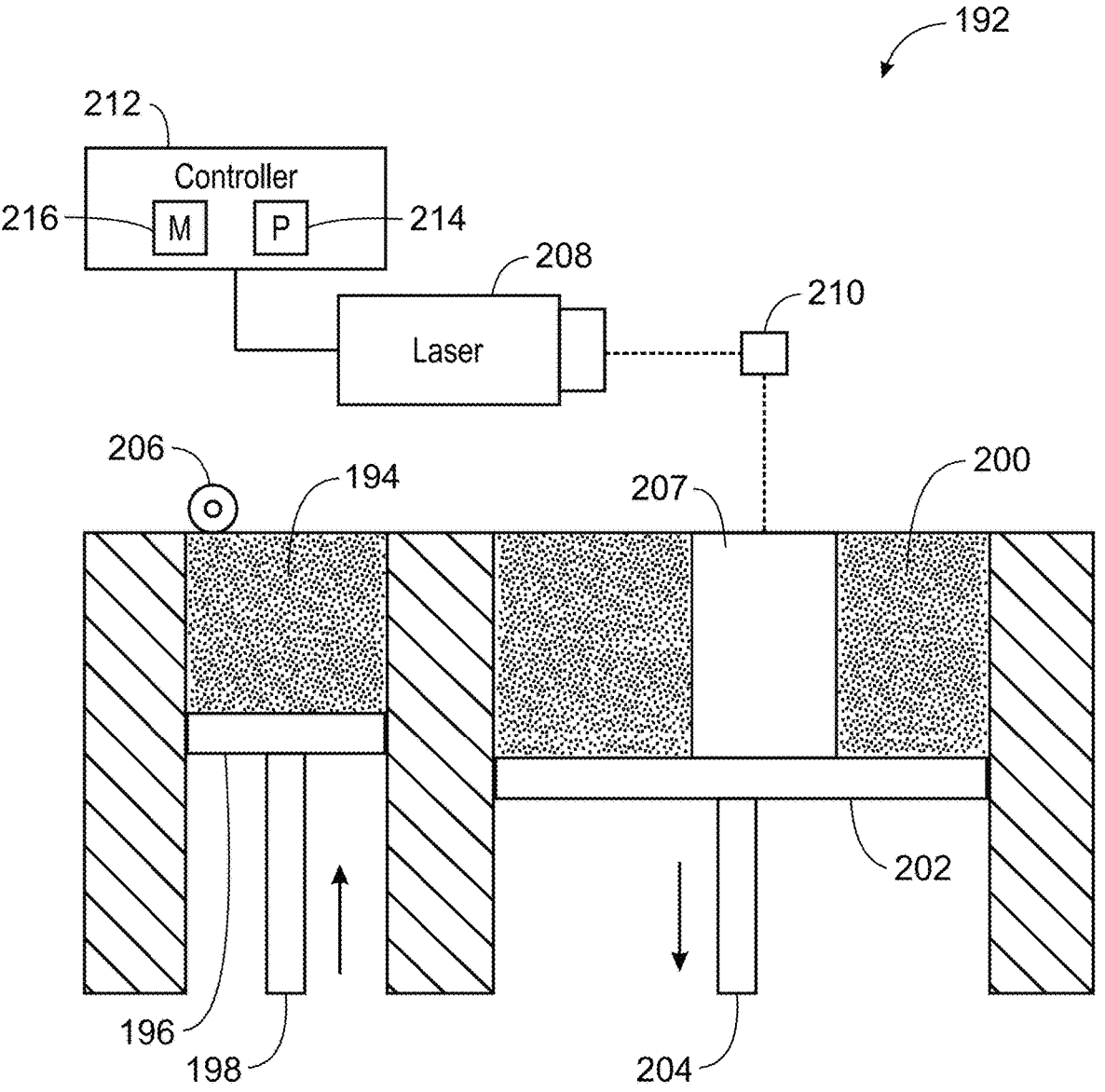
FIG. 14 depicts schematically a laser powder bed fusion system for printing walls or septa of a collimator, in accordance with aspects of the present disclosure.

As mentioned above, the collimator may be 3D printed utilizing LPBF. LPBF is also known as direct metal laser sintering (DMLS), selective laser melting (SLM) or direct metal printing (DMP). FIG. 14 depicts schematically an LPBF system 192 for printing walls or septa of a collimator. The LPBF system 192 includes a metal powder stock 194 (e.g., of tungsten powder) located on a powder platform 196 coupled to a piston 198. The LPBF system 192 also includes a powder bed 200 (e.g. having tungsten powder) located on a build platform 202 coupled to a piston 204. The LPBF system 192 further includes a powder roller 206 to transfer (e.g., spread) powder from the powder stock 194 to the powder bed 200 in between the formation of the layers of the wall or septum 207 of the collimator. The LPBF system 192 still further includes a laser 208 that may direct a laser via mirror 210 or directly onto powder bed 200 to form the layers of the wall or septum 207.

The LPBF system 192 still further includes a controller 212 coupled to the laser 208. The controller 212 includes include a processor 214 (e.g., processing circuitry) and memory 216 (e.g., memory circuitry). The processor 214 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 214 may include one or more reduced instruction set (RISC) processors or complex instruction set (CISC) processors. The processor 214 may execute instructions to carry out the various zig-zag printing strategies as described above to form the walls or septa of the collimator. These instructions may be encoded in programs or code stored in a tangible non-transitory computer-readable medium (e.g., an optical disc, solid state device, chip, firmware, etc.) such as the memory 216. The controller 212 controls the operation of the laser 208 and the LPBF system 192.

To form the wall or septum 207 of the collimator, a layer of powder (e.g., tungsten powder) is spread over the build platform 202 (e.g., via the powder roller 206). The laser 208 fuses this first layer of the wall or septum 207. A new layer of powder is then spread across the previous layer (e.g., via the powder roller 206) and a further layer is fused and added on the initial layer. This process repeats until the entire wall or septum 207 is formed (i.e., desired height of wall or septum is reached). Then the loose, unfused powder is removed during post-processing.

Technical effects of the disclosed embodiments include providing for a customized single vector zig-zag printing strategy (i.e., single vector per layer of a given wall) for 3D printing of a collimator that utilizes alternate vectors that are offset from a septum (e.g., wall) center by a half a vector distance in an opposite direction. Technical effects of the disclosed embodiments also include creating an article (i.e., the collimator) (where a conventional process would require a multi-vector strategy for a given thickness (i.e., greater than 100 micrometers)) having a smoother finish and a higher density. Technical effects of the disclosed embodiments further include improving productivity, unifies septa characteristics, and enables the printing of symmetrical walls. Technical effects of the disclosed embodiments even further include improving measurement capabilities when utilizing the collimator due to the use of backlight and the smoother finish which helps with edge detection. Technical effects of the disclosed embodiments still further include reducing cleaning time and reducing/removing the appearance of residual particles stuck to the septa surface.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for forming a metallic grid structure, comprising:

utilizing three-dimensional (3D) printing for:

printing a first layer of a first wall section of the metallic grid structure in a first direction along a first vector, wherein the first vector is offset from a first center line of the first wall section by half of a first distance of a first width of the first wall section; and printing a second layer of the first wall section directly on the first layer in a second direction along a second vector, wherein the second vector is offset from the first center line of the first wall section by half of the first distance of the first width of the first wall section, wherein the second direction is opposite the first direction, the second direction is parallel with the first direction, both the first vector and the second vector are offset from the first center line in a first transverse direction that is orthogonal to the first center line, the first width extends in the first transverse direction, and the first vector and the second vector are disposed on opposite sides of the first center line.

2. The method of claim 1, further comprising alternating printing layers of the first wall section in the first direction along the first vector and the second direction along the second vector until a desired height of the first wall section is reached.

3. The method of claim 2, further comprising alternating printing respective layers of a plurality of walls of the metallic grid structure in the first direction along the first vector and the second direction along the second vector until the desired height of each wall of the plurality of walls is reached, wherein the first vector and the second vector utilized in printing each wall are offset in the first transverse direction from a respective first center line of each wall and are disposed on opposite sides of the respective first center line of each wall.

4. The method of claim 1, further comprising utilizing 3D printing for:

printing the first layer of a second wall section of the metallic grid structure in a third direction along a third vector, wherein the third vector is offset from a second center line of the second wall section by half of a second distance of a second width of the second wall section; and printing the second layer of the second wall section directly on the first layer in a fourth direction along a fourth vector, wherein the fourth vector is offset from the second center line of the second wall section by half of the second distance of the second width of the second wall section, wherein the fourth direction is opposite the third direction, the fourth direction is parallel the third direction, both the third vector and the fourth vector are offset from the second center line in a second transverse direction that is orthogonal to the second center line, the second width extends in the second transverse direction, the third vector and the fourth vector are disposed on opposite sides of the second center line, and both the third direction and the fourth direction are orthogonal to both the first direction and the second direction.

5. The method of claim 4, further comprising alternating printing layers of the second wall section in the third direction along the third vector and the fourth direction along the fourth vector until a desired height of the second wall section is reached.

6. The method of claim 4, wherein at the first wall section and the second wall section are joined at an intersection.

7. The method of claim 1, further comprising utilizing 3D printing for:

printing the first layer of a second wall section of the metallic grid structure in second direction along the second vector; and printing the second layer of the second wall section directly on the first layer in the first direction along the first vector, wherein the first wall section and the second wall section are adjacent each other and are aligned along the first direction.

8. The method of claim 1, wherein the first vector and the second vector comprise the only vectors along the first direction and the second direction, respectively, for printing the first wall section.

9. The method of claim 1, wherein the metallic grid structure comprises an anti-scatter grid or collimator configured for use with an X-ray detector of an X-ray imaging system.

10. The method of claim 9, wherein the metallic grid structure comprises tungsten.

11. The method of claim 1, wherein the 3D printing comprises laser powder bed fusion.

12. The method of claim 1, wherein the first distance of the first width of the first wall section is greater than 100 micrometers.

* * * * *